United States Patent [19]
Thorland

[11] Patent Number: 5,386,289
[45] Date of Patent: Jan. 31, 1995

[54] CASE MOUNTED READOUT FOR PROVIDING A RING LASER GYRO WITH LOW BACKSCATTER

[75] Inventor: Rodney H. Thorland, Shoreview, Minn.

[73] Assignee: Honeywell Inc., Minneapolis, Minn.

[21] Appl. No.: 775

[22] Filed: Jan. 5, 1993

[51] Int. Cl.[6] ............................................. G01C 19/66
[52] U.S. Cl. .................................................. 356/350
[58] Field of Search ........................... 356/350; 372/94

[56] References Cited

U.S. PATENT DOCUMENTS

| | | | |
|---|---|---|---|
| 3,373,650 | 4/1965 | Killpatrick | 356/350 |
| 4,167,336 | 9/1979 | Ljung | 356/350 |
| 4,190,364 | 2/1980 | Ljung et al. | 356/350 |
| 4,582,429 | 4/1986 | Callaghan | 356/350 |
| 4,712,917 | 12/1987 | Bergstrom et al. | |
| 4,783,170 | 11/1988 | Bergstrom | |

FOREIGN PATENT DOCUMENTS

1335636 10/1973 United Kingdom .

Primary Examiner—Samuel A. Turner
Attorney, Agent, or Firm—Craig J. Lervick

[57] ABSTRACT

Low rate performance is vastly improved by reducing undesired backscatter sources. Backscatter is eliminated by repositioning some of the backscattered sources to direct any reflected backscatter out of the lasing plane. The case mounted optical elements of a case mounted readout system are positioned such that all of the initial services which are encountered by optical signals are an angle not normal to the optical signal. This positioning causes any reflections off of the aforementioned surfaces to be directed away from the lasing plane that is eliminating the possibility that these reflections will be coupled back into the lasing cavity.

28 Claims, 5 Drawing Sheets

CASE MOUNTED READOUT FOR PROVIDING A RING LASER GYRO WITH LOW BACKSCATTER

BACKGROUND OF THE INVENTION

The present invention relates to readout devices for use in ring laser angular rate sensors. Specifically, the present invention provides a readout device that displays improved performance at low input rates by eliminating scatter sources.

Ring laser angular rate sensors or ring laser gyroscopes are fairly well known in the field of angular rate sensing. Examples of ring laser gyroscopes are shown in U.S. Pat. No. 3,373,650 which is assigned to the assignee of the present invention. In summary, two counter propagating light beams are maintained within a closed loop path to form a rotation sensing device. Rotation of this device around an axis which is normal to a plane containing the closed loop path causes the relative path lengths in either direction to change. Detections of these changes in path length can be used to measure the rate of rotation.

When ring laser gyroscopes are rotated at a very low rate, the counter rotating light beams do not maintain their independence and may resonate together or "lock-in" loss of independence of the counter propagating light beams' results in degraded performance of the gyro.

The problems encountered at low input rates are caused primarily by backscattering. Backscattering occurs when the optical signal propagating in one direction within the ring laser gyro is scattered back into the gyro but in the opposite direction. Backscattering can be due to sources within the laser cavity or sources outside the laser cavity. Since it is desirable that the optical signals within the ring laser gyro oscillate independently at their particular frequencies, backscatter is detrimental as it causes an unwanted coupling influence between the two optical signals.

In order to improve performance at low input rates the angular rate sensor is rotationally oscillated or dithered. If the readout signal is averaged over a period of time the average rotation rate of the oscillation signal is zero. Therefore this oscillation or dither will not affect the sensitivity of the gyro. The dither signal or rotational oscillation of the ring laser gyroscope can be removed from the output signal by either geometrically eliminating the effects of this oscillation or electronically removing the dither signal. To eliminate the dithering geometrically the optical elements making up the readout must be appropriately placed. Once appropriately placed the change in path length due to dithering is cancelled out by the scale factor of the gyroscope.

To accomplish geometric removal of the dither signal or "dither stripping" some of the optic elements making up the readout device must not be connected to the laser block itself. Therefore, during dithering the laser block itself is rotationally oscillated while the readout optics are not.

Numerous readouts are traditionally placed on the ring laser angular rate sensor to perform numerous other functions. An example of these functions are laser intensity sensing to assure the optical signals within the ring laser angular rate sensor are resonating at a sufficiently strong level.

Gyro dither is effective in mitigating the effect of scatter sources that oscillate along with the gyro block; however, dither is not effective in mitigating the effects of case mounted components. There are numerous sources of back scattering including the readout optics used, optical sensors attached to the laser gyro or the gyro case, and even the laser gyro case itself.

Figure 1:
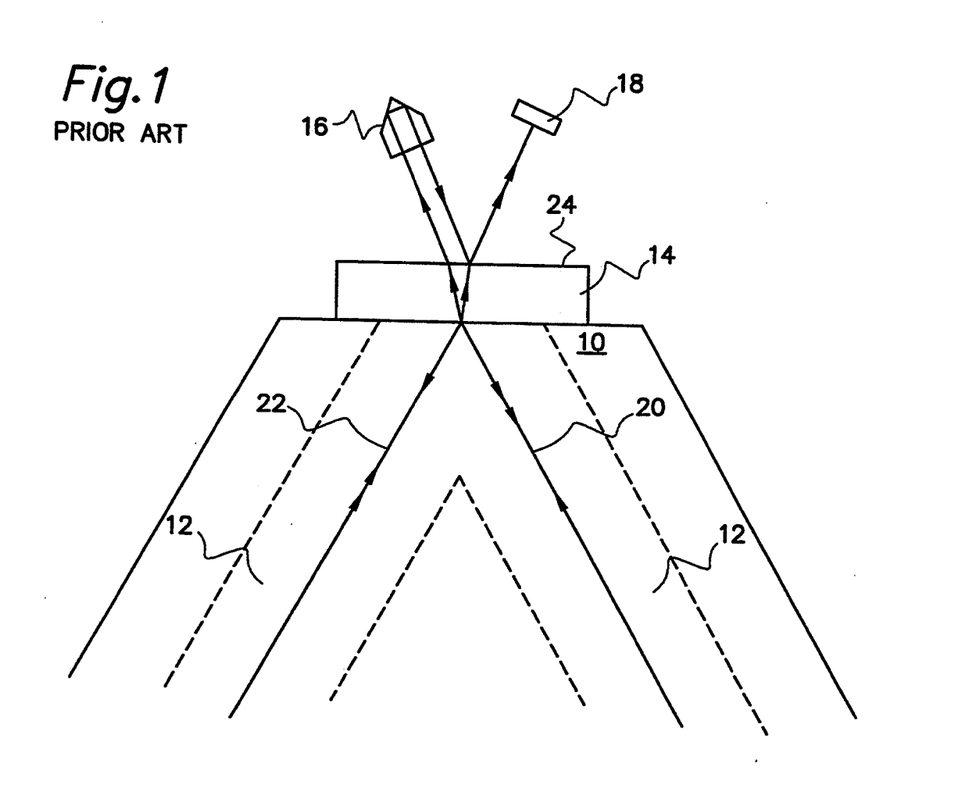
FIG. 1 is a schematic diagram which shows a prior art readout system.

Referring now to FIG. 1 there is shown a prior art readout system. A laser block 10 contains a number of tunnels or bores 12 which create a closed loop path within laser block 10. Bores 12 carry the optical signals which make up the angular rate sensor. Upon one corner of laser block 10 there is an output mirror 14 which is partially reflective and partially transmissive. Output mirror 14 allows a portion of the optical signals within laser block 10 to be transmitted through output mirror 14 while another portion of the optical signals is reflected back into the adjoining bore 12. Shown as lines on FIG. 1 are a counter clockwise signal or CCW signal 20 and a clockwise signal or CW signal 22. While FIG. 1 represents only one corner of the ring laser gyro it is understood that the gyro block 10 makes up a closed loop path with mirrors on the corners of the closed loop path. CCW signal 20 is transmitted through output mirror 14 and toward a corner cube 16 which is mounted to the gyro case (not shown). Corner cube 16 causes CCW signal 20 to be translated and reflected back towards output mirror 14. Upon meeting an upper surface 24 of output mirror 14 CCW signal 20 is reflected off surface 24 and directed onto an optical sensor 18. Meanwhile, CW signal 22 is transmitted through output mirror 14 and directly onto optical sensor 18. Optical sensor 18 receives a combination of CCW signal 20 and CW signal 22. Those skilled in the art will recognize that this combination of these two signals can be used to detect rotation.

In summary, the effects of dithering are cancelled out by the scale factor of the gyro. Dithering causes a change in the path lengths of the optical signals. This change in path length is then designed to be exactly cancelled out by the gyro scale factor. However, changes in path length due to common rotation of both the gyro block 10 and the gyro case will still be detected.

SUMMARY OF THE INVENTION

It is an object of the present invention to provide a readout for a ring laser gyro which helps to improve the low rate performance of the gyro. This improvement is accomplished by reducing undesired scatter coupling. Reducing scatter coupling also helps to mitigate the problem of lock-in.

It is a further object of the present invention to improve performance while still utilizing the case mounted type readout, thus allowing for the use of geometric dither stripping.

The readout of the present invention uses a case mounted type readout whereby the optical sensors, and the corner cube are mounted to the case. Having these optical elements mounted to the case allows the gyro block to dither separate from the aforementioned optical elements. By configuring the elements in this way, the effects of dithering upon the gyro output are removed through geometry.

To reduce the amount of undesired scatter coupling, the surface of all optical elements (the readout sensor, the PLC sensor, and the corner cube) are tilted so they are not normal to their respective incoming optical signal. The surfaces of the optical elements are further not normal to the gyro lasing plane. By tilting the optics in this direction, the elements can be tilted further out of normal while still being positioned to function efficiently. The tilt of the optical elements reduces the backscattering caused by these elements because any direct reflections will be directed out of the lasing plane and will not interfere with the counter propagating signals. Furthermore, the indirect reflections traveling back toward the gyro cavity are reduced.

BRIEF DESCRIPTION OF THE DRAWINGS

A preferred embodiment will now be described with continual reference to the attach figures in which like reference numbers refer to like elements.

Further objects and advantages of the present invention can be seen by reading the following detailed description of the invention in conjunction with the attached drawings in which:

FIG. 4 is a schematic side view illustrating the alignment of the optics of the present invention wherein.

DETAILED DESCRIPTION OF THE INVENTION

Figure 2:
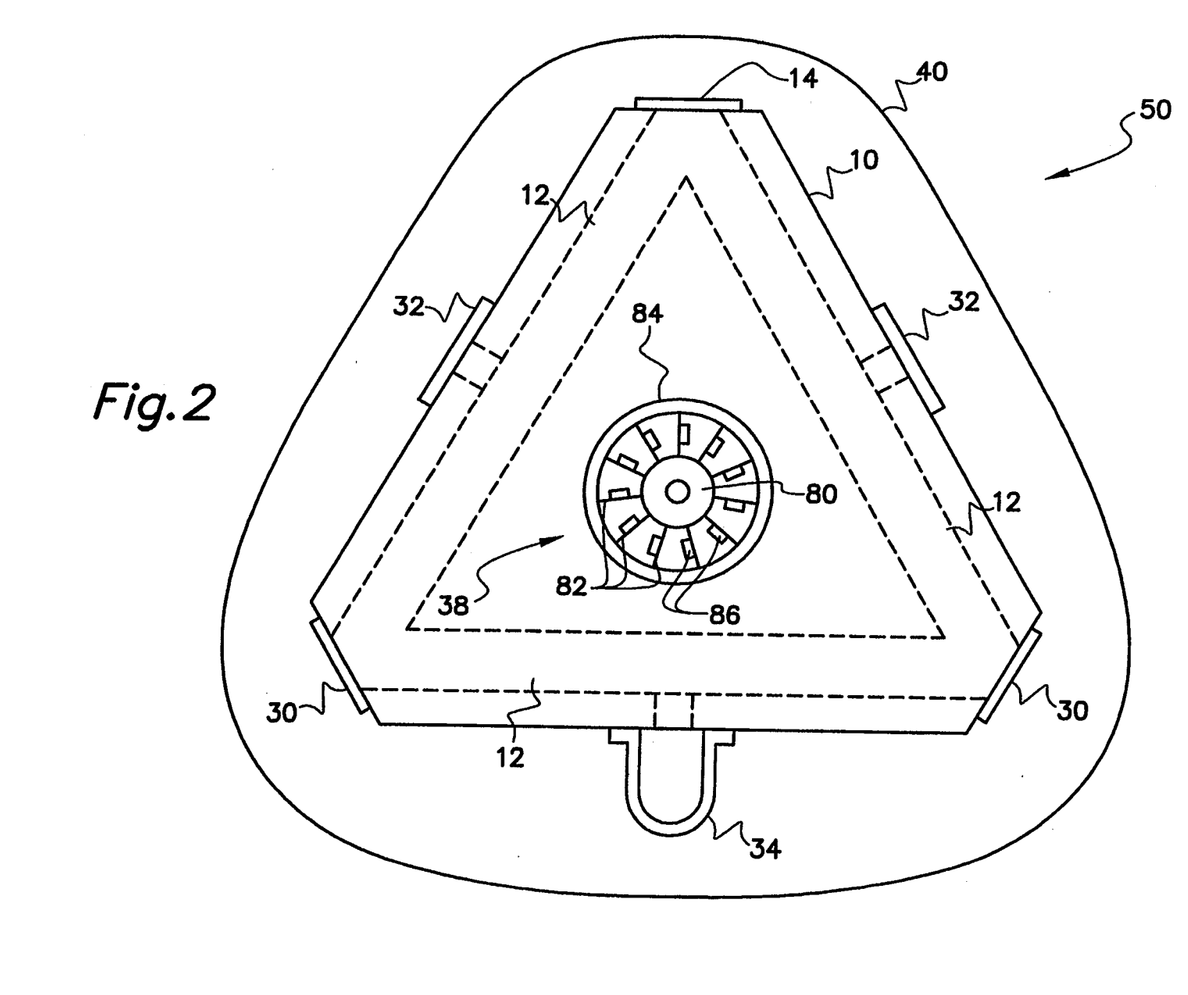
FIG. 2 is a schematic diagram illustrating the elements of an operating ring laser gyro.

Referring now to FIG. 2 there is shown a ring laser gyroscope 50 which operates in accord with the principles of the present invention. Gyroscope 50 has a laser block 10 having a polygonal configuration. The laser block 10 of the present embodiment is configured in a substantially triangular shape and has a plurality of bores 12 for carrying the optical signals used to detect rotation. Bores 12 extend to connect at each corner of laser block 10. Upon two corners of laser block 10 are corner mirrors 30. On a third corner of laser block 10 is an output mirror 14. Output mirror 14 is a partially reflective mirror allowing a portion of an optical signal to be reflected off of the surface of the mirror while a second portion of the signal is transmitted through output mirror 14. Output mirror 14 and corner mirrors 30 are used to cause an optical signal to be reflected around the closed loop path created by bores 12.

Bores 12 contain an active gas to allow the creation of a gas discharge laser. Lasing is assisted by a pair of anodes 32 and cathode 34. Cathode 32 and anodes 34 are in communication with bores 12 via communication bores 36. By applying an electrical potential between cathode 34 and anodes 32 a gas discharge laser is created within bores 12 creating light beams which travel around the closed loop path created by bores 12.

To improve low input rate performance and eliminate the problems of lock-in, the ring laser gyro of the present invention is rotationally oscillated or dithered. This dithering is done by a dither means 38 which causes laser block 10 to be rotationally oscillated about its central axis.

Laser block 10 and dither means 38 are contained within a mounting case 40. Dither means 38 causes laser block 10 to be rotationally oscillated with respect to case 40. Dither means 38 comprises a central hub member 80, a plurality of spokes 82, a plurality of piezoelectric elements 86 and an outer rim member 84. Piezoelectric elements 86 are excited by an oscillatory signal and cause outer rim 84 to oscillate with respect to central post 80. Since central post 80 is attached to case 40, block 10 is caused to oscillate with respect to case 40.

Figure 3:
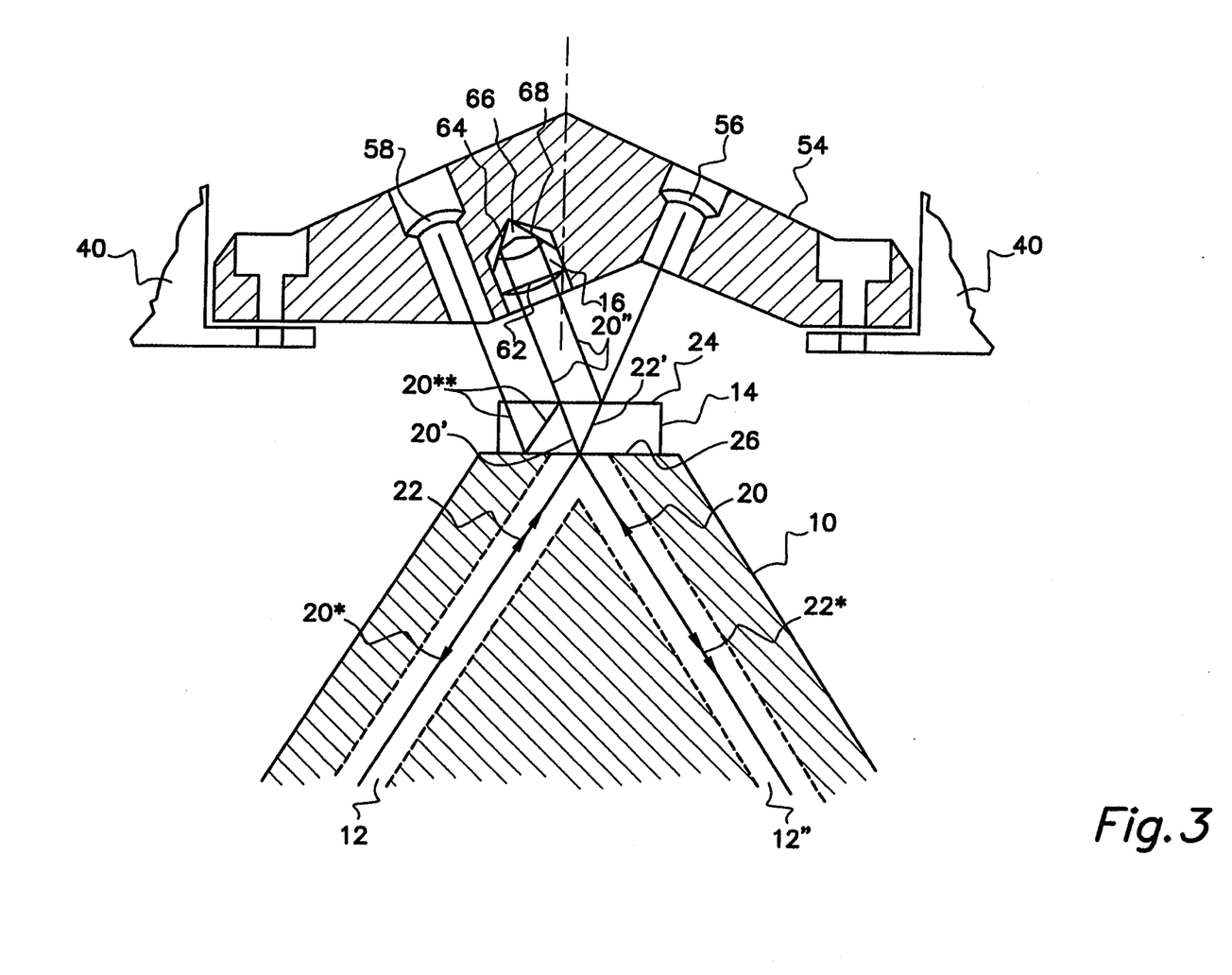
FIG. 3 is a cross-sectional diagram illustrating one embodiment of a readout utilizing the principles of the present invention.

Referring now to FIG. 3 there is shown an exploded view of one corner of ring laser gyro 50. Gyro block 10 is positioned in close proximity to a readout holder 54. Readout holder 54 has all the facilities to house corner cube 16, a readout optical sensor 56, and a path length control optical sensor or PLC optical sensor 58. Readout holder 54 provides an easy means of positioning and holding all optical elements. Readout holder 54 is attached to gyro mounting case 40 so that optical sensors 56, 58 and corner cube 16 are held stationary while gyro block 10 oscillates or dithers. In the preferred embodiment readout holder 54 is made out of a machinable plastic to provide ease of manufacturer and reduced cost.

As is well known in the art, it is necessary to combine the two counter propagating optic signals, CCW signal 20 and CW signal 22, to provide a meaningful output indicative of ring laser gyro rotation. This optical combination is achieved through a number of reflections, thus, causing a combined optical signal to be projected upon readout sensor 56.

CCW optical signal 20 intersects output mirror 14 at an inner surface 26. Output mirror 14 is a partially reflective and partially transmissive mirror, thus a portion of CCW signal 20, is reflected back into optical cavity 12 while a second portion 20' of CCW signal 20 is transmitted into output mirror 14. Partial CCW optical signal 20' then intersects output mirror upper surface 24 which is a second partially reflective surface. A portion 20'' of partial CCW signal 20' is transmitted through output mirror upper surface 24 while a second portion 20** is reflected off mirror upper surface 24. CCW optical signal 20'' is then directed toward corner cube 16. Corner cube 16 is a optical prism having an initial surface 62 and three reflective surfaces 64, 66, and 68. Portional optical signal 20'' intersects with corner cube initial surface 62 and is transmitted therethrough. Subsequently, portional CCW signal 20'' intersects first reflecting surface 64 and is directed towards second reflecting surface 66 which then directs portional CCW signal 20'' to third reflective surface 68. Upon intersection with third reflective surface 68 portional CCW signal 20'' is directed back towards corner cube initial surface 62 and is transmitted therethrough thus directing portional CCW signal 20'' back towards output mirror 14. The following is reflection through corner cube initial surface 62 portional CCW signal 20'' then intersects with output mirror upper surface 24.

Alternatively, CW signal 22 also intersects output mirror lower surface 26 where a portion 22' of CW signal 22 is transmitted through output mirror lower surface 26 while a second portion 22* is reflected off of output mirror lower surface 26. Following its transmission through output mirror lower surface 26 portional CW signal 22' then intersects output mirror upper surface 24. The point at which proportional CW signal 22' intersects with output mirror upper surface 24 coincides with the point at which portional CCW signal 20'' intersects with output mirror upper surface following its reflection from corner cube 16. At this point, portional CCW signal 20'' is reflected off of output mirror upper surface 24 while proportional CW signal 22'' is transmitted through output mirror upper surface 24. These two signals, in combination, are directed toward readout optical sensor 56. This combination of CW signal 22 and CCW signal 20 when projected upon readout optical sensor 56 provides meaningful data regarding the rotation of ring laser gyro 50.

Referring again to CCW signal 20, when portional CCW signal 20″ intersects output mirror upper surface 24 a portion 20 is reflected back towards output mirror lower surface 26. The point at which portional CCW signal 20 intersects with output mirror lower surface 26 is a totally reflective surface thus causing optical signal 20** to be totally reflected back towards output mirror upper surface 24. This optical signal is then transmitted through output mirror upper surface 24 and directed towards PLC sensor 58. As is well known in the art this PLC sensor is used to control the path length of the gyro cavity thus improving its performance.

As previously mentioned backscattering can occur when the optical signals within ring laser gyro 50 encounter any surface upon which reflection can be produced. It is desired that all reflections be reduced thus eliminating the chance that optical signals will be reflected back into the laser cavity 12 thus detrimentally effecting the performance of the gyroscope. All of the optical elements within readout holder 54 have flat surfaces upon which the respective optical signals are directed. Specifically, readout optical sensor 56 has a planar surface upon which combined CW signal 22 and CCW signal 20 are projected, PLC sensor 58 has a planar surface upon which CCW signal 20 is projected and corner cube 16 has an initial surface 62 which is planar. If these surfaces are held normal to the incoming optical signal backscatter can result.

Figure 4A:
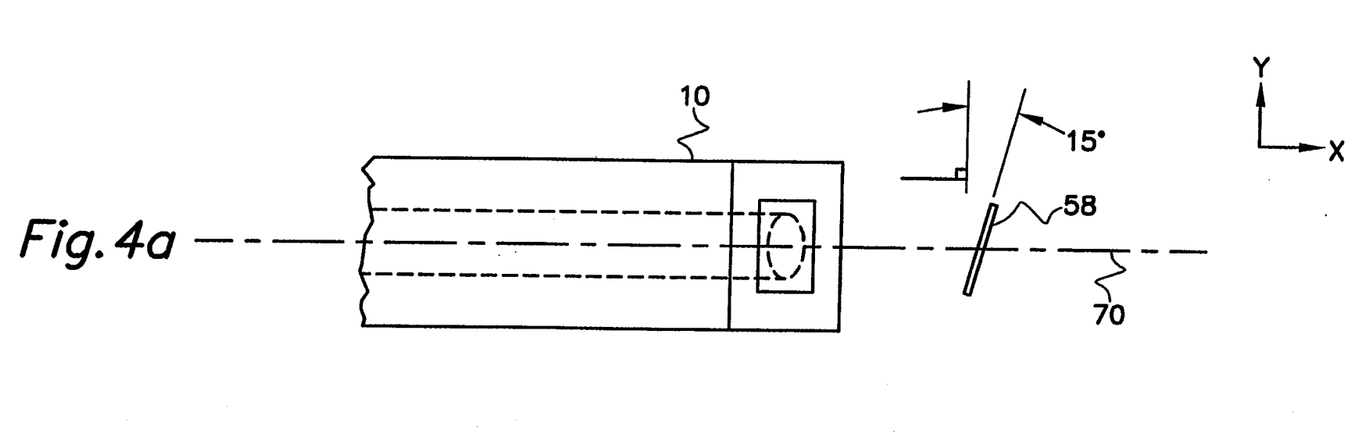
FIG. 4A shows the positioning of the PLC sensor.

Referring now to FIG. 4, all of the optical elements housed in readout sensor 54 are tilted at an angle to direct any reflection off of their respective planar surfaces out of the lazing plane. Referring now specifically to FIG. 4A, there is shown a diagram illustrating the relative positioning of the PLC sensor 58 with respect to gyro block 10 and the lasing plane 70. Lasing plane 70 is the plane in three dimensional space in which CCW signal 20 and CW signal 22 propagate while inside of laser block 10. In the preferred embodiment PLC sensor 58 is held at an angle of 75° with respect to lasing plane 70. For reference an X and Y axis are illustrated in FIG. 4A and is understood that a Z access projects into the plane of the Figure. Note that PLC sensor 58 is held at an angle of 75° with respect to the X axis while also being held parallel to the Z axis.

Figure 4B:
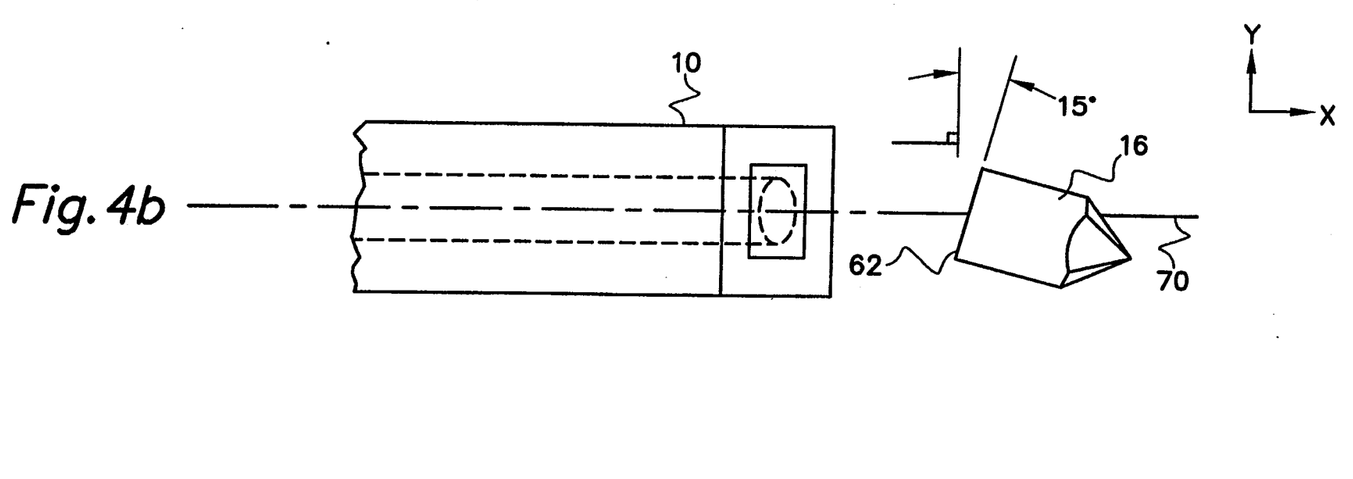
FIG. 4B shows the positioning of the corner cube.

Referring now to FIG. 4B there is shown a diagram illustrating the relative positioning of the corner cube with respect to the lasing plane. Again, an X and Y axis is shown in FIG. 4B for reference. The corner cube initial surface 62 is held at an angle of 75° with respect to the X axis and 15° with respect to the Y axis while being held parallel to the Z axis. Again, any reflections coming off corner cube initial surface 62 will be directed out of lasing plane 70.

Figure 4C:
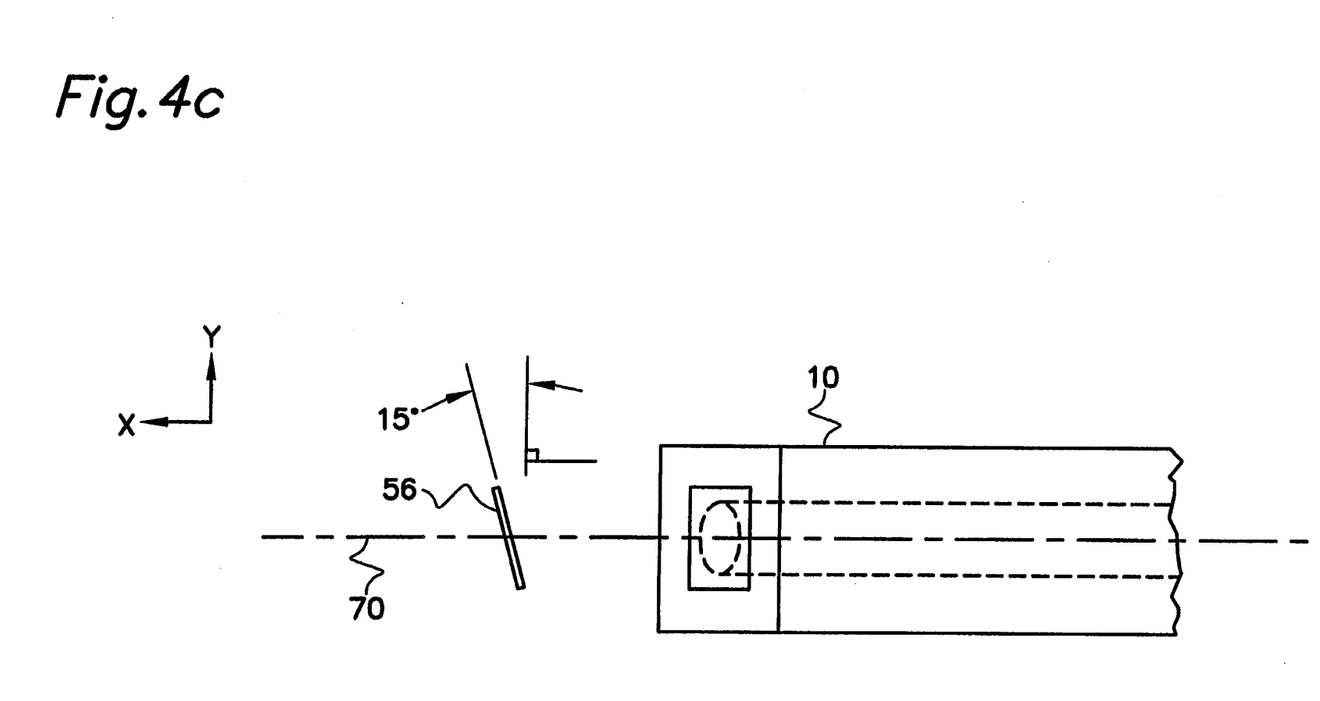
FIG. 4C shows the positioning of the readout sensor.

Lastly, FIG. 4C illustrates the relative positioning of readout sensor 56 with respective to laser block 10 and lasing plane 70. Again, an X and Y axis is shown for reference and the planar surface of optical sensor 56 is held at an angle of 15° with respect to the Y axis. Again, readout sensor 56 is held parallel with the Z axis which is defined to go into the plane of the figure. Readout sensor 56 again causes any reflections off initial surface 62 also to be directed out of lasing plane 70.

By positioning corner cube 16 readout sensor 56, and PLC sensor 58 to cause any reflection off of their planar surfaces to be directed out of the lasing plane the possibility of undesired scatter coupling back into the laser cavity is reduced. As previously discussed, this scatter coupling into the laser cavity detrimentally effects performance and contributes to the problems of lock-in. By positioning all of these optical elements appropriately low rate performance is improved.

Having illustrated and described the principles of the invention in the preferred embodiment, it should be apparent to those skilled in the art that the invention can be modified in arrangement and detail without departing from such principles. We claim all modifications coming within the scope and spirit of the following claims.

What is claimed is:

1. A readout apparatus which is for use with a ring laser gyroscope which outputs a first optical signal and a second optical signal, the first and second optical signals propagating within a single lasing plane, the readout apparatus comprising:

a corner cube means for receiving a first optical signal, translating the first optical signal and directing the first optical signal back in the general direction from which it came;

readout sensor means for receiving a combined optical signal comprised of the first optical signal and the second optical signal, and outputting an electrical signal indicative of the combined optical signal, the readout sensor means having a planer surface for receiving the combined optical signals; and a case mounted optics holder means for holding the readout sensor means such that the combined optical signal intersects the surface of the readout sensor means while the readout sensor surface is tilted with respect to a plane normal to the lasing plane, the optics holder means also for positioning the corner cube means so as to receive the first optical signal while having any planar surfaces of the corner cube means tilted with respect to a plane normal to the lasing plane in which the first and second optical signals are propagating.

2. The readout apparatus of claim 1 further comprising an intensity sensor means attached to the optics holder means for receiving a single optical signal and outputting an electrical signal indicative of the optical signals intensity, the intensity sensor means positioned such that it is tilted with respect to a plane normal to the lasing plane in which the first and second optical signal propagate.

3. The readout apparatus of claim 1 wherein the readout sensor means planar surface is aligned so a line created by the intersection between the lasing plane and the readout optical sensor means planar surface is normal to the combined optical signal.

4. The readout apparatus of claim 1 wherein the corner cube means having an initial surface which is aligned so a line created by the intersection between the lasing plane and the corner cube means initial surface is normal to the transmitted first optical signal.

5. The readout apparatus of claim 2 wherein a plc optical sensor means having a planar surface which is aligned so a line created by the intersection between the lasing plane and the intensity optical sensor means planar surface which is normal to the combined optical signal.

6. The readout apparatus of claim 3 wherein the planar surface of the readout sensor is aligned to be at an angle of 75 degrees with respect to the lasing plane.

7. The readout apparatus of claim 4 wherein the corner cube having receiving surface which is aligned at an angle of 75 degrees with respect to the lasing plane.

8. The readout apparatus of claim 5 wherein the plc optical sensor planar surface is aligned at an angle of 75 degrees with respect to the lasing plane.

9. A ring laser gyro, comprising:

a gyro block containing a closed loop polygonal path for supporting a first counter propagating optical signal and a second counter propagating optical signal within a single lasing plane, the block having a plurality of corners;

an output mirror attached to the block at one corner of the block, the output mirror positioned so as to receive the first counter propagating optical signal and the second counter propagating optical signal at a surface of the output mirror, reflect a portion of the optical signals while transmit the remaining portion of the optical signals;

a case mounted corner cube means positioned behind the output mirror for receiving an optical signal, translating the optical signal and transmitting the optical signal back toward the output mirror, the corner cube having a receiving surface and a plurality of reflective surfaces, the receiving surface being oriented such that it is tilted with respect to a plane normal to the lasing plane; and a case mounted readout optical sensor positioned behind the output mirror for receiving a combined signal comprising a combination of the first optical signal and the second optical signal and producing an electrical signal indicative of the combined signal, the readout optical sensor having a planar surface which is aligned such that it is tiled with respect to a plane normal to the lasing plane.

10. The ring laser gyro of claim 9 further comprising a plc optical sensor positioned behind the output mirror for receiving the first optical signal and outputting an electrical signal indicative of the first optical signal, the plc optical sensor having a planar surface aligned such that it is tilted with respect to a plane normal to the lasing plane.

11. The ring laser gyro of claim 9 wherein the planar surface of the readout optical sensor is aligned to be at an angle of 75 degrees with respect to the lasing plane.

12. The ring laser gyro of claim 9 wherein the corner cube receiving surface is aligned at an angle of 75 degrees with respect to the lasing plane.

13. The ring laser gyro of claim 10 wherein the plc optical sensor planar surface is aligned at an angle of 75 degrees with respect to the lasing plane.

14. A readout apparatus for use in a ring laser gyroscope wherein the ring laser gyroscope has a block supporting a first counter propagating optical signal and a second counter propagating optical signal within a single lasing plane, comprising:

output mirror means having a first surface and a second surface, the first surface attached to the block and for receiving both the first optical signal and the second optical signal, transmitting a portion of the first optical signal and the second optical signal through the output mirror means and out of the second surface while reflecting the remaining portion of the first optical signal and the second optical signal;

a case mounted corner cube means positioned behind the output mirror means for receiving the transmitted portion of first optical signal from the output mirror means, translating the transmitted portion of the first optical signal, and directing the first optical signal toward the second surface of the output mirror means so that the translated first optical signal intersects with the output mirror second surface at a point where the transmitted portion of the second optical signal emerges from the output mirror means, the output mirror thus causing the transmitted first optical signal to be reflected at that point, the corner cube means having an initial planar surface which is aligned to be tilted with respect to a plane normal to the lasing plane;

case mounted readout optical sensor means positioned behind the output mirror means for receiving a combined optical signal comprising transmitted first optical signal and transmitted second optical signal and producing an electrical signal indicative of the combined optical signal, the readout optical sensor means having a planar surface for receiving the combined optical signal which is aligned to be tilted with respect to a plane normal to the lasing plane; and intensity optical sensor means positioned behind the output mirror means for receiving the transmitted first optical signal and producing an electrical signal indicative of the transmitted first optical signal, a control optical sensor means having a planar surface for receiving the transmitted first optical signal which is aligned to be tilted with respect to a plane normal to the lasing plane.

15. The readout apparatus of claim 14 wherein the corner cube means having an initial surface which is aligned so a line created by the intersection between the lasing plane and the corner cube means initial surface is normal to the transmitted first optical signal.

16. The readout apparatus of claim 14 wherein the readout optical sensor means planar surface is aligned so a line created by the intersection between the lasing plane and the readout optical sensor means planar surface is normal to the combined optical signal.

17. The readout apparatus of claim 14 wherein the intensity optical sensor means having a planar surface which is aligned so a line created by the intersection between the lasing plane and the intensity optical sensor means planar surface is normal to the combined optical signal.

18. The readout apparatus of claim 14 wherein the corner cube means having an initial surface which is at an angle of seventy-five degrees with respect to the lasing plane.

19. The readout apparatus of claim 16 wherein the readout optical sensor means planar surface is at an angle of seventy-five degrees with respect to the lasing plane.

20. The readout apparatus of claim 17 wherein the intensity optical sensor means planar surface is at an angle of seventy-five degrees with respect to the lasing plane.

21. The readout apparatus of claim 14 further comprising a readout holder for holding the corner cube means, an output optical sensor means, and the intensity optical sensor means.

22. A ring laser gyroscope for sensing rotation, comprising:

a gyro case;

a dither means attached to the gyro case for providing rotational oscillation;

a gyro block attached to the dither means, the gyro block containing a closed loop polygonal path for supporting a first optical signal and a second optical signal within a single lasing plane, wherein the first optical signal and the second optical signal propagate around the closed loop path in opposite directions, the gyro block having a plurality of corners;

an output mirror attached to the block at one corner of the block, the output mirror positioned so as to receive the first optical signal and the second optical signal at a surface of the output mirror, reflect a portion of the optical signals while transmit the remaining portion of the optical signals;

a case mounted corner cube means attached to the gyro case and positioned behind the output mirror, the corner cube means for receiving the first optical signal, translating the first optical signal and transmitting the first optical signal back toward the output mirror, the corner cube having a receiving surface and a plurality of reflective surfaces, the receiving surface being oriented such that it is tilted with respect to a plane normal to the lasing plane;

a case mounted readout optical sensor attached to the gyro case and positioned behind the output mirror for receiving a combined signal comprising a combination of the first optical signal and the second optical signal and producing an electrical signal indicative of the combined signal, the readout optical sensor having a planar surface which is aligned such that it is tilted with respect to a plane normal to the lasing plane; and a plc sensor attached to the gyro case for receiving the first optical signal and producing an electrical signal indicative of the first optical signal, the plc sensor having a planar surface for receiving the first optical signal, the plc sensor planar surface aligned such that it is tilted with respect to a plane normal to the lasing plane.

23. The readout apparatus of claim 22 wherein the corner cube means initial surface is aligned so a line created by the intersection between the lasing plane and the corner cube means initial surface is normal to the transmitted first optical signal.

24. The readout apparatus of claim 22 wherein the readout optical sensor planar surface is aligned so a line created by the intersection between the lasing plane and the readout optical sensor means planar surface is normal to the combined optical signal.

25. The readout apparatus of claim 22 wherein the plc sensor planar surface is aligned so a line created by the intersection between the lasing plane and the intensity optical sensor means planar surface is normal to the combined optical signal.

26. The ring laser gyro of claim 24 wherein the planar surface of the readout optical sensor is aligned to be at an angle of 75 degrees with respect to the lasing plane.

27. The ring laser gyro of claim 23 wherein the corner cube receiving surface is aligned at an angle of 75 degrees with respect to the lasing plane.

28. The ring laser gyro of claim 25 wherein the plc optical sensor planar surface is aligned at an angle of 75 degrees with respect to the lasing plane.

* * * * *